T. C. Richards,
Tackle Block,
Nº 53,341. Patented Mar. 20, 1866.
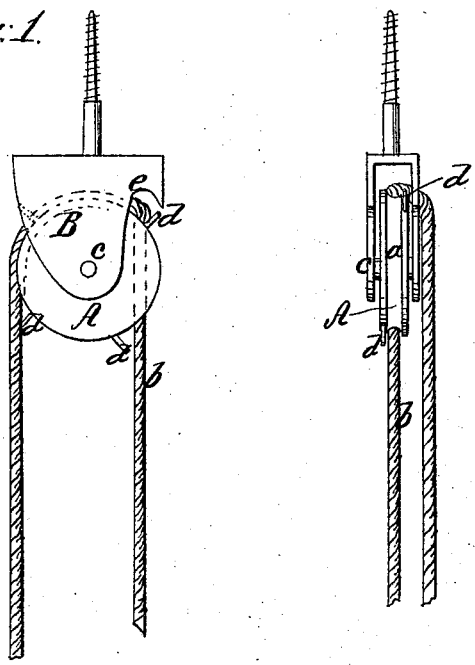
Witnesses;
M. M. Livingston
Wm Dean Overell
Inventor;
T. C. Richards

UNITED STATES PATENT OFFICE.

THOMAS C. RICHARDS, OF NEW YORK, N. Y.

IMPROVEMENT IN SELF-STOPPING PULLEYS.

Specification forming part of Letters Patent No. 53,341, dated March 20, 1866.

*To all whom it may concern:*

Be it known that I, THOMAS C. RICHARDS, of the city, county, and State of New York, have invented a new and Improved Self-Stopping Pulley; and I do hereby declare that the following is a full, clear, and exact description thereof, which will enable those skilled in the art to make and use the same, reference being had to the accompanying drawings, forming a part of this specification, in which—

Figure 1 represents a front elevation of this invention. Fig. 2 is an end view of the same.

Similar letters of reference indicate like parts.

This invention is the arrangement of one or more projections on the circumference of a pulley, in combination with suitable recesses in the cap or case which forms the bearings for the axle of said pulley, in such a manner that when the cord which passes over the pulley is drawn over the edge thereof it is caught between one of the projections and the recess of the case and the pulley is stopped, and by these means a pulley is obtained which is of great convenience for window-shades and for many other purposes.

A represents a pulley, made of brass or any other suitable material, and provided with a groove, *a*, to receive the cord *b*. This pulley rotates on an axle, *c*, which has its bearings in the side pieces or jaws of the case B, and it is provided with a series of pins or stops, *d*, which project from its circumference on one or both sides of the groove *b*. These stops are so formed that they do not increase the cost thereof, and they increase the value of the pulley very materially, as will be presently explained.

The case B is provided with a recess, *e*, on one or both sides of the pulley, and if it is desired to stop the pulley it is only necessary to pull the cord out over its edge, as shown in the drawings. If the cord is brought in this position, it is caught between one of the stops and the recess *e*, and the pulley is prevented from revolving.

One stop on the pulley and one recess in the case may be sufficient for most purposes; but in many cases it is desirable to have several stops on the pulley and a recess in each jaw of the case, and I prefer to make all my pulleys in this manner.

These pulleys are of great convenience for window-shades, but they can be used for a great many purposes where a self-stopping pulley is desirable.

What I claim as new, and desire to secure by Letters Patent, is—

The arrangement of one or more stops, *d*, projecting from the circumference of the pulley A, in combination with one or more recesses, *e*, in the case B, constructed and operating substantially as and for the purpose described.

T. C. RICHARDS.

Witnesses:
M. M. LIVINGSTON,
ALEX. F. ROBERTS.